(12) United States Patent
Toronjo

(10) Patent No.: US 10,195,815 B2
(45) Date of Patent: *Feb. 5, 2019

(54) ARTICLE OF APPAREL INCLUDING AUXETIC LAYER COUPLED TO ELASTIC LAYER

(71) Applicant: Under Armour, Inc., Baltimore, MD (US)

(72) Inventor: Alan Toronjo, Baltimore, MD (US)

(73) Assignee: Under Armour, Inc., Baltimore, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/459,952

(22) Filed: Mar. 15, 2017

(65) Prior Publication Data

US 2017/0182732 A1     Jun. 29, 2017

Related U.S. Application Data

(63) Continuation of application No. 13/838,827, filed on Mar. 15, 2013, now Pat. No. 9,629,397.

(Continued)

(51) Int. Cl.
*B32B 3/24* (2006.01)
*B32B 3/26* (2006.01)
(Continued)

(52) U.S. Cl.
CPC .............. *B32B 3/266* (2013.01); *A41B 1/08* (2013.01); *A41D 1/00* (2013.01); *A41D 1/06* (2013.01); *A41D 31/005* (2013.01); *A41D 31/0016* (2013.01); *A42B 1/041* (2013.01); *A42B 1/08* (2013.01); *A42B 1/22* (2013.01); *A43B 3/26* (2013.01); *A43B 5/06* (2013.01); *A43B 23/027* (2013.01); *A43B 23/028* (2013.01); *A43B 23/0215* (2013.01); *A43B 23/0295* (2013.01); *A43B 23/042* (2013.01); *A45F 3/04* (2013.01); *A45F 3/12* (2013.01); *A63B 71/1225* (2013.01); *B32B 5/18* (2013.01); *B32B 27/08* (2013.01); *A41D 13/0015* (2013.01); *A41D 13/05* (2013.01); *A41D 31/00* (2013.01);
(Continued)

(58) Field of Classification Search
CPC ..................................... B32B 3/266
See application file for complete search history.

(56) References Cited

U.S. PATENT DOCUMENTS 4,668,557 A   5/1987  Lakes
4,809,690 A   3/1989  Bouyssi
(Continued)

FOREIGN PATENT DOCUMENTS

FR      2876879       4/2006
JP      10072719 A    3/1998
(Continued)

OTHER PUBLICATIONS

European Search Report from EU Application No. 13179068, dated Nov. 20, 2013.

*Primary Examiner* — William P Watkins, III
(74) *Attorney, Agent, or Firm* — Maginot, Moore & Beck LLP

(57) ABSTRACT

An article of apparel includes a base layer and an auxetic layer. The base layer includes a four way stretch material. The auxetic layer is coupled to the base layer and includes an auxetic structure defining a repeating pattern of voids. The base layer is exposed by at least one void of the auxetic layer.

20 Claims, 15 Drawing Sheets

Related U.S. Application Data

(60) Provisional application No. 61/695,993, filed on Aug. 31, 2012.

(51) Int. Cl.

| | | |
|---|---|---|
| *A41D 31/00* | (2006.01) | |
| *A41D 1/00* | (2018.01) | |
| *A43B 23/02* | (2006.01) | |
| *A42B 1/22* | (2006.01) | |
| *A45F 3/04* | (2006.01) | |
| *A45F 3/12* | (2006.01) | |
| *A41B 1/08* | (2006.01) | |
| *A41D 1/06* | (2006.01) | |
| *A42B 1/04* | (2006.01) | |
| *A42B 1/08* | (2006.01) | |
| *A43B 3/26* | (2006.01) | |
| *A43B 5/06* | (2006.01) | |
| *A43B 23/04* | (2006.01) | |
| *A63B 71/12* | (2006.01) | |
| *B32B 5/18* | (2006.01) | |
| *B32B 27/08* | (2006.01) | |
| *A41D 13/00* | (2006.01) | |
| *A41D 13/05* | (2006.01) | |
| *A45F 3/00* | (2006.01) | |

(52) U.S. Cl.
CPC . *A45F 2003/001* (2013.01); *A63B 2071/1208* (2013.01); *A63B 2071/1258* (2013.01); *B32B 2307/51* (2013.01); *B32B 2437/00* (2013.01); *B32B 2571/00* (2013.01); *Y10T 428/24306* (2015.01); *Y10T 428/24314* (2015.01)

(56) References Cited

U.S. PATENT DOCUMENTS

| | | | |
|---|---|---|---|
| 5,334,903 | A | 8/1994 | Smith |
| 5,661,854 | A | 9/1997 | March |
| 5,937,441 | A | 8/1999 | Raines |
| 6,029,376 | A | 2/2000 | Cass |
| 6,247,181 | B1 | 6/2001 | Hirsch |
| 6,539,556 | B1 | 4/2003 | Barker |
| 6,783,814 | B2 | 8/2004 | Swager |
| 6,878,320 | B1 | 4/2005 | Alderson |
| 6,989,075 | B1 | 1/2006 | Kao |
| D521,191 | S | 5/2006 | Berger |
| 7,160,621 | B2 | 1/2007 | Chaudhari |
| 7,247,265 | B2 | 7/2007 | Alderson |
| 7,252,870 | B2 | 8/2007 | Anderson |
| 7,350,851 | B2 | 4/2008 | Barvosa-Carter |
| 7,455,567 | B2 | 11/2008 | Bentham et al. |
| 7,650,648 | B2 | 1/2010 | Roberts |
| 7,858,055 | B2 | 6/2010 | Lee |
| 7,824,763 | B2 | 11/2010 | Namburi |
| 7,896,294 | B2 | 3/2011 | Dittrich |
| 7,910,193 | B2 | 3/2011 | Ma |
| 7,989,057 | B2 | 8/2011 | Alderson |
| 8,074,418 | B2 | 12/2011 | Thiagarajan |
| 8,084,117 | B2 | 12/2011 | Lalvani |
| 8,304,355 | B2 | 11/2012 | Baldauf |
| 8,436,508 | B2 | 5/2013 | Kombluh |
| 2002/0132543 | A1 | 9/2002 | Baer |
| 2005/0035031 | A1 | 2/2005 | Alderson |
| 2005/0159066 | A1 | 7/2005 | Alderson |
| 2006/0129227 | A1 | 6/2006 | Hengelmolen |
| 2007/0031667 | A1 | 2/2007 | Hook |
| 2007/0093768 | A1 | 4/2007 | Roe |
| 2007/0213838 | A1 | 9/2007 | Hengelmolen |
| 2007/0286987 | A1 | 12/2007 | Anderson |
| 2008/0011021 | A1 | 1/2008 | Starbuck |
| 2008/0032598 | A1 | 2/2008 | Bentham |
| 2008/0248710 | A1 | 10/2008 | Wittner |
| 2009/0041978 | A1 | 2/2009 | Sogard |
| 2009/0119820 | A1 | 5/2009 | Bentham |
| 2009/0239049 | A1 | 9/2009 | Hook |
| 2009/0265839 | A1 | 10/2009 | Young |
| 2010/0029796 | A1 | 2/2010 | Alderson |
| 2010/0107317 | A1 | 5/2010 | Wang |
| 2010/0305535 | A1 | 12/2010 | Leeming |
| 2010/0306904 | A1 | 12/2010 | Neid |
| 2011/0029063 | A1 | 2/2011 | Ma |
| 2011/0039088 | A1 | 2/2011 | Lee |
| 2011/0046715 | A1 | 2/2011 | Ugbolue |
| 2011/0059291 | A1 | 3/2011 | Boyce |
| 2011/0144417 | A1 | 6/2011 | Jagger |
| 2011/0155137 | A1 | 6/2011 | Martin |
| 2011/0156314 | A1 | 6/2011 | Alberg |
| 2011/0159758 | A1 | 6/2011 | Martin |
| 2011/0168313 | A1 | 7/2011 | Ma et al. |
| 2011/0209557 | A1 | 9/2011 | Burns |
| 2011/0214560 | A1 | 9/2011 | Skertchly |
| 2011/0236519 | A1 | 9/2011 | Skertchly |
| 2011/0247240 | A1 | 10/2011 | Eder |
| 2011/0250383 | A1 | 10/2011 | Summers |
| 2011/0252544 | A1 | 10/2011 | Abernethy |
| 2011/0265714 | A1 | 11/2011 | Lee |
| 2011/0281481 | A1 | 11/2011 | Alderson |
| 2011/0282452 | A1 | 11/2011 | Koerner |
| 2012/0029537 | A1 | 2/2012 | Mortarino |
| 2012/0055187 | A1 | 3/2012 | Raines |
| 2012/0060991 | A1 | 3/2012 | Mun |
| 2012/0066820 | A1 | 3/2012 | Fresco |
| 2012/0129416 | A1 | 5/2012 | Anand |
| 2013/0071583 | A1 | 3/2013 | Evans |
| 2013/0134992 | A1 | 5/2013 | Zhu |
| 2016/0172661 | A1 | 6/2016 | Nonogawa |

FOREIGN PATENT DOCUMENTS

| | | |
|---|---|---|
| JP | 2007138320 A | 6/2007 |
| WO | 2010082537 S1 | 7/2010 |
| WO | 2012069787 | 5/2012 |

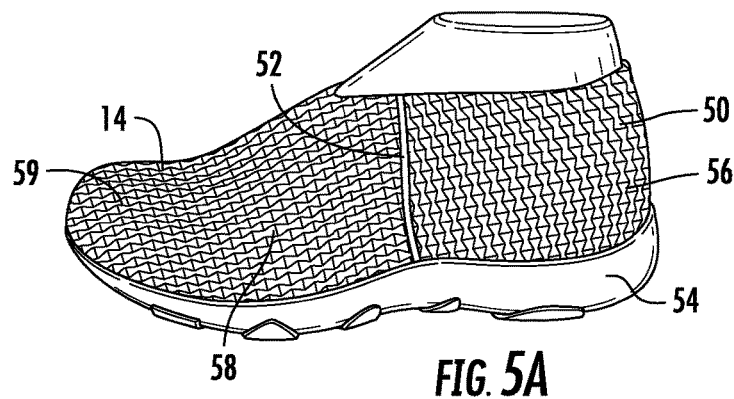
FIG. 5A
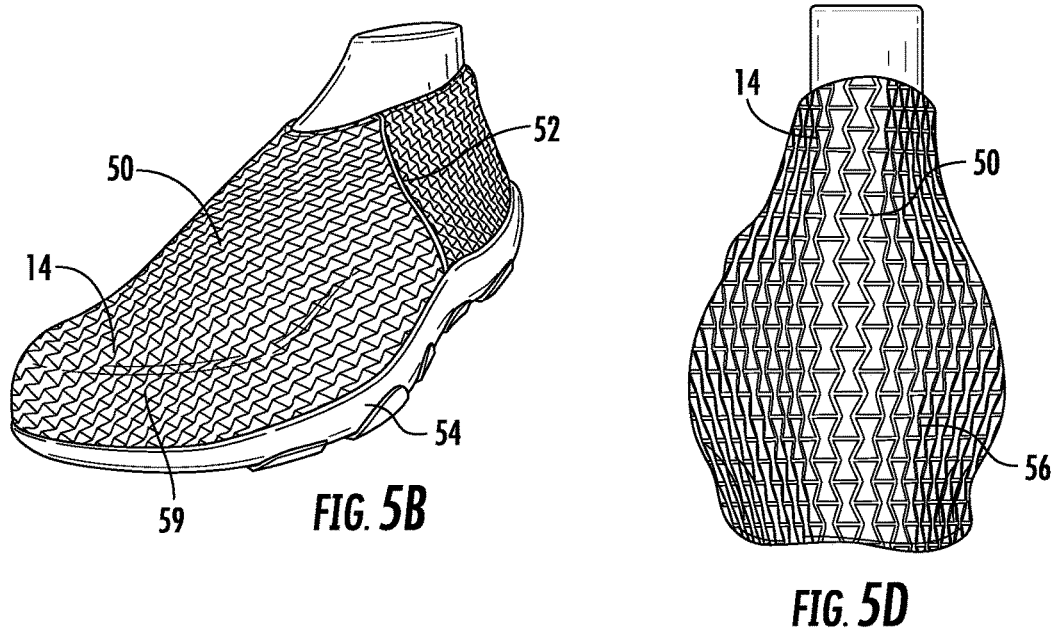
FIG. 5B
FIG. 5D
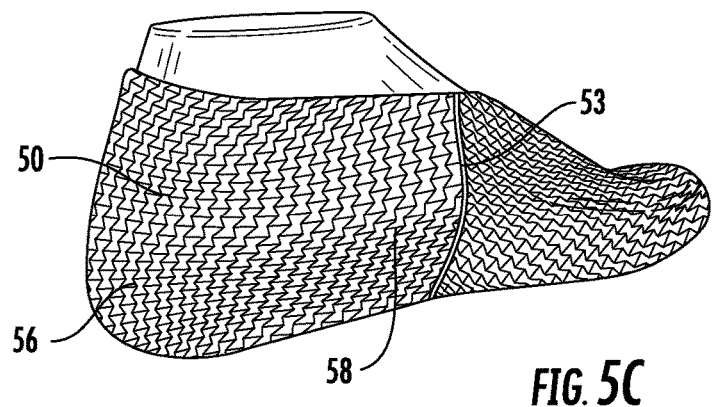
FIG. 5C

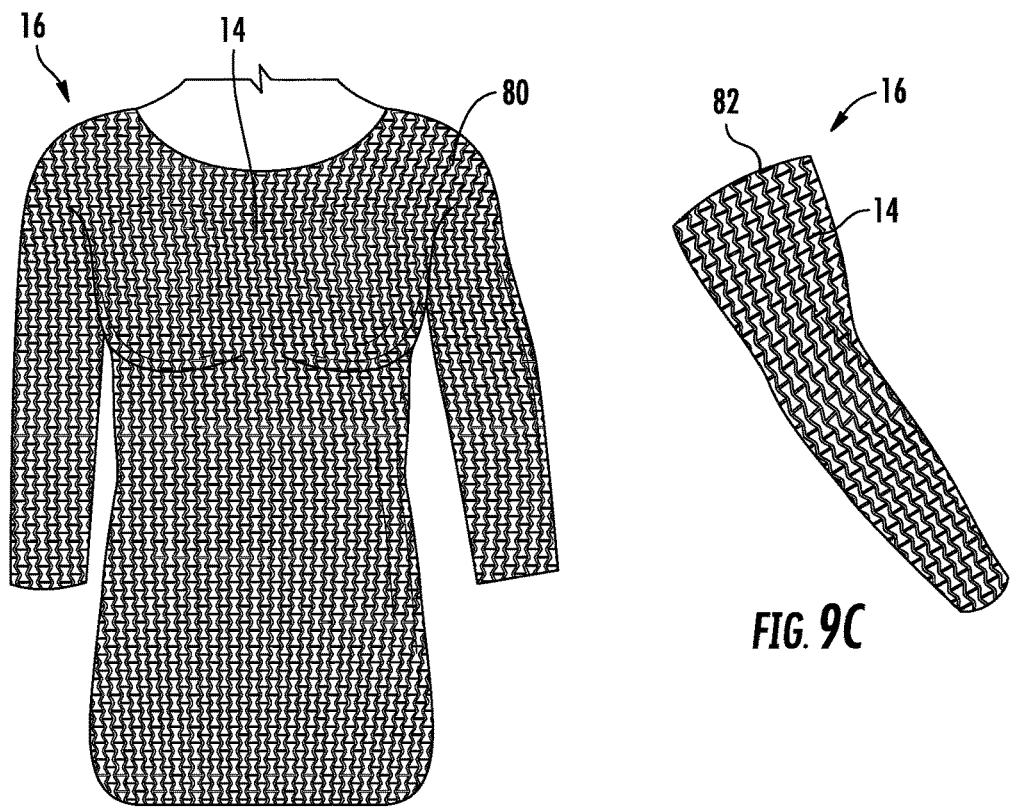
FIG. 9A
FIG. 9C
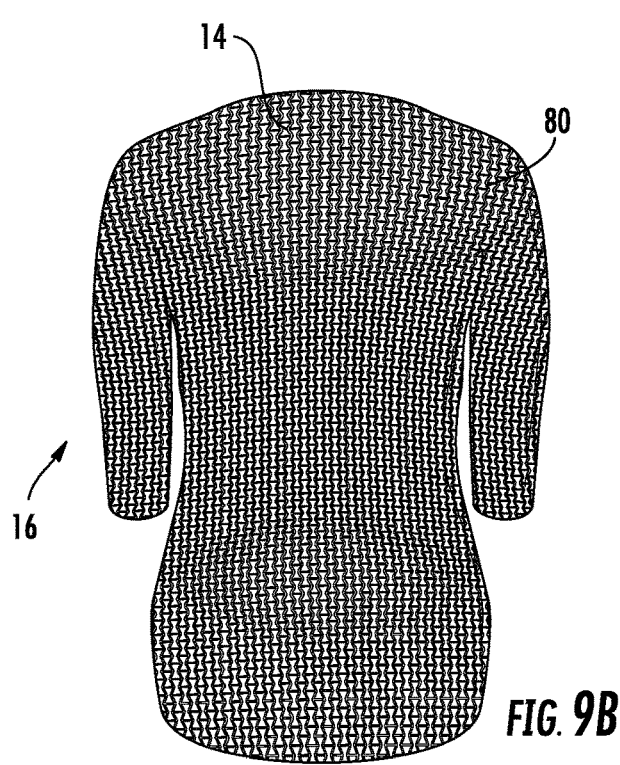
FIG. 9B

ARTICLE OF APPAREL INCLUDING AUXETIC LAYER COUPLED TO ELASTIC LAYER

CROSS-REFERENCE TO RELATED APPLICATIONS

This document is a continuation of U.S. patent application Ser. No. 13/838,827, filed Mar. 15, 2013, which claims priority from U.S. Provisional Patent Application No. 61/695,993, filed Aug. 31, 2012, the contents of which are incorporated herein by reference in their entirety.

FIELD

The present disclosure relates to the field of apparel, and particularly to garments, padding, bags or other products configured to be worn or carried on the body.

BACKGROUND

Many garments and other articles of apparel are designed to fit closely to the human body. When designing an article of apparel for a close fit to the human body, different body shapes and sizes must be considered. Different individuals within a particular garment size will have different body shapes and sizes. For example, two individuals wearing the same shoe size may have very differently shaped heels. As another example, two individuals wearing the same shirt size may have very different chest to abdomen dimensions. These variable measurements between similarly sized individuals makes proper design of closely fitting garments difficult.

In addition to accounting for different body measurements for different individuals within a size, various contours of the human body must also be considered when designing closely fitting articles of apparel. These contours of the human body often include various double curvature surfaces. Spheroids, bowls, and saddle-backs are all examples of surfaces having double curvatures. If a garment is not properly sized for a particular wearer, the wearer may experience undesirable tightness or looseness at various locations. Such an improper fit may result in discomfort, excessive wear, or bending or creasing of the garment at the poorly fitting locations.

In view of the foregoing, it would be desirable to provide a garment or other article of apparel capable of conforming to various body shapes within a given size range. It would also be desirable to provide a garment or other article of apparel that is capable of conforming to various double curvatures on the human body. In addition, it would be desirable for such a garment or article of apparel to be relatively inexpensive and easy to manufacture.

SUMMARY

In accordance with one exemplary embodiment of the disclosure, there is provided an article of apparel comprising a base layer comprising a four way stretch material and an auxetic layer coupled to the base layer, the auxetic layer comprising an auxetic structure defining a repeating pattern of voids, wherein the base layer is exposed by at least one void of the repeating pattern of voids.

Pursuant to another exemplary embodiment of the disclosure, there is provided an article of apparel comprising an elastic material and a near auxetic structure coupled to the elastic material. The near auxetic structure including a plurality of interconnected members forming an array of voids, wherein the elastic material is exposed by at least one void of the near auxetic structure.

In accordance with yet another exemplary embodiment of the disclosure, there is provided an article of apparel comprising a first layer and a second layer. The first layer comprises an elastic sheet. The second layer is coupled to the first layer. The second layer comprises a structure having a Poisson's ratio of substantially zero or less than zero. The structure includes a plurality of interconnected members defining a uniform array of substantially planar shapes with voids formed between the interconnected members in the second layer. Each of the interconnected members is directly coupled to the first layer.

The above described features and advantages, as well as others, will become more readily apparent to those of ordinary skill in the art by reference to the following detailed description and accompanying drawings. While it would be desirable to provide an article of apparel that provides one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

FIG. 5A shows a side view of an article of apparel incorporating the auxetic arrangement of FIG. 2A in a shoe upper;

FIG. 5B shows a front perspective view of the shoe upper of FIG. 5A;

FIG. 5C shows a rear perspective view of the shoe upper of FIG. 5A;

FIG. 5D shows a rear view of the shoe upper of FIG. 5A;

FIG. 9A shows a front view of an article of apparel incorporating the auxetic arrangement of FIG. 2A in a garment, and particularly a shirt;

FIG. 9B shows a rear view of the shirt of FIG. 9A;

FIG. 9C shows a side view of an article of apparel incorporating the auxetic arrangement of FIG. 2A in an arm sleeve;

DESCRIPTION

As described herein, an article of apparel includes a base layer and an auxetic layer coupled to the base layer. The term "article of apparel" as used herein refers to any garment, footwear or accessory configured to be worn on or carried by a human. Examples of articles of apparel include, helmets, hats, caps, shirts, pants, shorts, sleeves, knee pads, elbow pads, shoes, boots, backpacks, duffel bags, cinch sacks, and straps, as well as numerous other products configured to be worn on or carried by a person.

The term "auxetic" as used herein generally refers to a material or structure that has a negative Poisson's ratio. In other words, when stretched, auxetic materials become thicker (as opposed to thinner) in a direction perpendicular to the applied force. This occurs due to their inherent hinge-like structures within the materials, which flex when stretched.

Figure 1A:
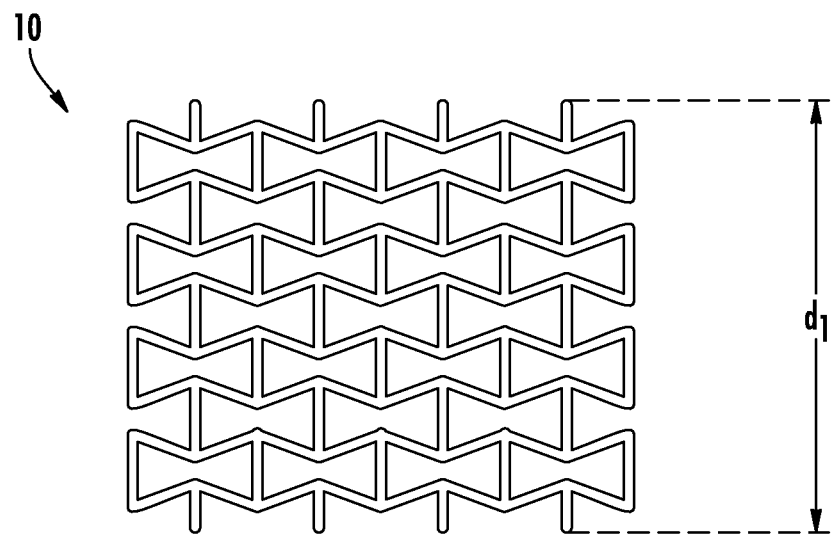
FIG. 1A shows a plan view of an auxetic structure including segments and voids forming a plurality of reentrant shapes.
Figure 1B:
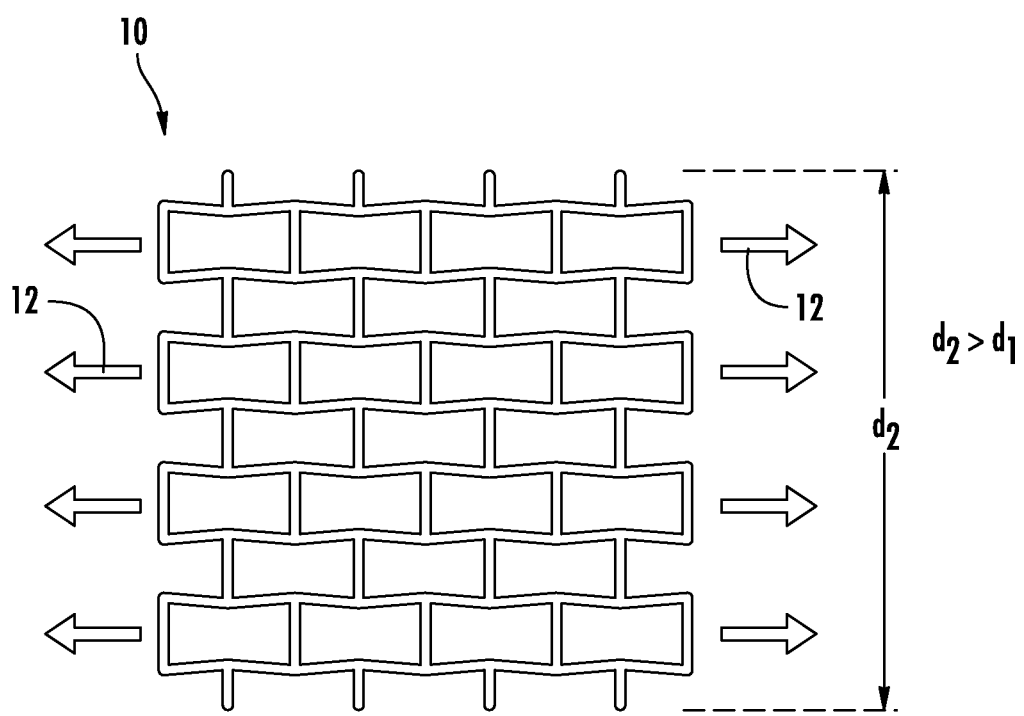
FIG. 1B shows a plan view of the auxetic structure of FIG. 1A in an expanded position.

One exemplary auxetic structure 10 is shown in FIGS. 1A and 1B. The auxetic structure 10 is provided by an array of bow-tie shaped cells (which may also be referred to as "auxetic hexagons"), including a plurality of rows and columns of cells. FIG. 1A shows the auxetic structure 10 in an unstretched state, with the thickness (or width) of the auxetic structure in the unstretched state being d1. FIG. 1B shows the auxetic structure 10 stretched in the direction of arrows 12, with the thickness of the auxetic structure in the stretched state being d2. As can be seen in FIG. 1B, when the auxetic structure is stretched in the direction of arrows 12, the auxetic structure 10 becomes thicker in a direction perpendicular to the arrows 12 than it was when in the unstretched state (i.e., d2>d1).

It will be recognized that whether a structure has a negative Poisson's ratio, may depend upon the degree to which the structure is stretched. Structures may have a negative Poisson's ratio up to a certain stretch threshold, but when stretched past the threshold may have a positive Poisson's ratio. For example, when the auxetic structure 10 in FIG. 1A is stretched in the direction of arrows 12 past a threshold (e.g., past the state shown in FIG. 1B), the cells and segments of the auxetic structure 10 may be stretched to an extent that the auxetic structure 10 becomes slightly thinner (in the direction perpendicular to arrows 12) before the structure is torn apart or otherwise damaged. Accordingly, the term "auxetic" as used herein refers to structures or materials that have a negative Poisson's ratio within certain stretch thresholds. Furthermore, while the term "auxetic" is used herein to refer to a structure that has a negative Poisson's ratio, it will be recognized that structures may be "near auxetic". A "near auxetic" structure is a structure having a Poisson's ratio of about zero, or less than 0.15.

Auxetic materials come in various different types and forms. Auxetic materials can be single molecules or a particular structure of macroscopic matter. Some, but not all, auxetic structures are formed from a plurality of interconnected segments forming an array of voids/holes, each void having a reentrant shape (i.e., in the field of geometry, a reentrant shape may also be referred to as a "concave", or "non-convex" polygon or shape, which is a shape having an interior angle with a measure that is greater than 180°). The auxetic structure 10 in FIGS. 1A and 1B is an example of such a structure.

Figure 2A:
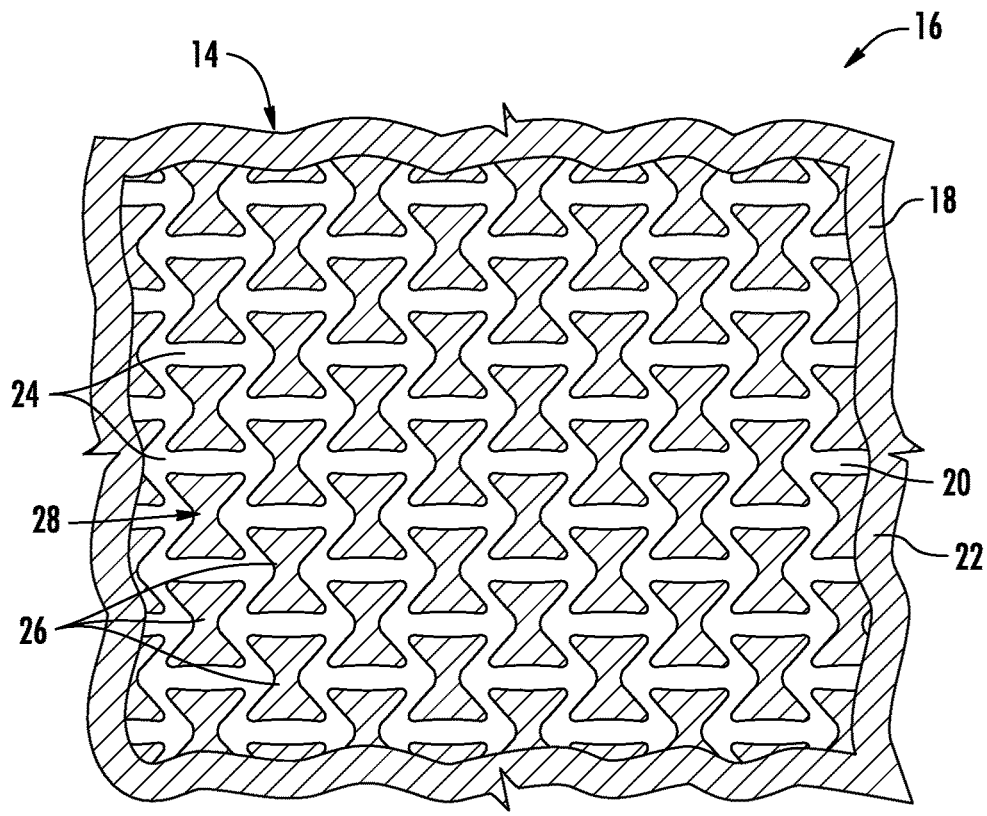
FIG. 2A shows a panel of an article of apparel including an auxetic arrangement with the auxetic structure of FIG. 1A.
Figure 2B:
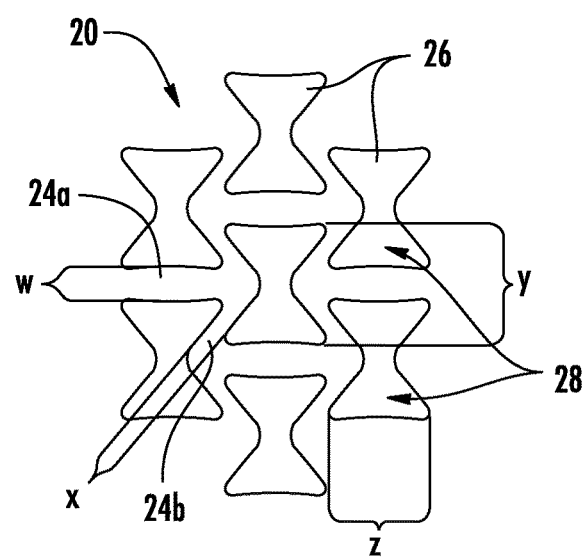
FIG. 2B shows dimensions of the auxetic arrangement of FIG. 2A.

With reference now to FIGS. 2A and 2B, in at least one exemplary embodiment, an article of apparel 16 comprises at least one panel 18 or other portion of the article of apparel 16 that includes an auxetic structure 10, thus providing an auxetic arrangement 14 on the article of apparel 16. The auxetic arrangement 14 is comprised of a first layer 20 coupled to a second layer 22 (the second layer 22 is shown under the first layer 20 in FIG. 2A). The first layer 20 is an auxetic layer including an auxetic structure. The second layer 22 is a base layer provided by a stretchable material, and may also be referred to herein as a "base layer".

Figure 3A:
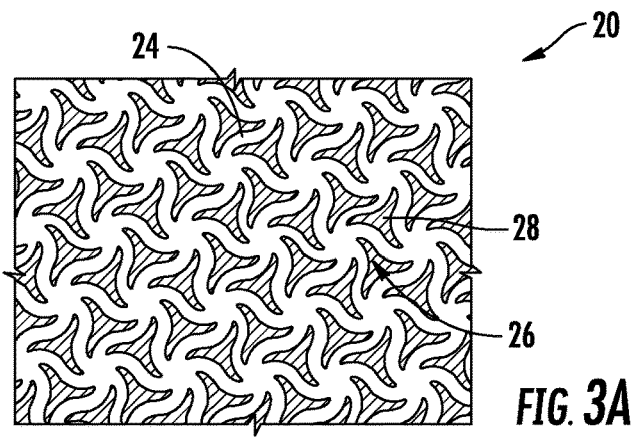
FIG. 3A shows a plan view of an alternative embodiment of the auxetic structure of FIG. 1A.
Figure 3B:
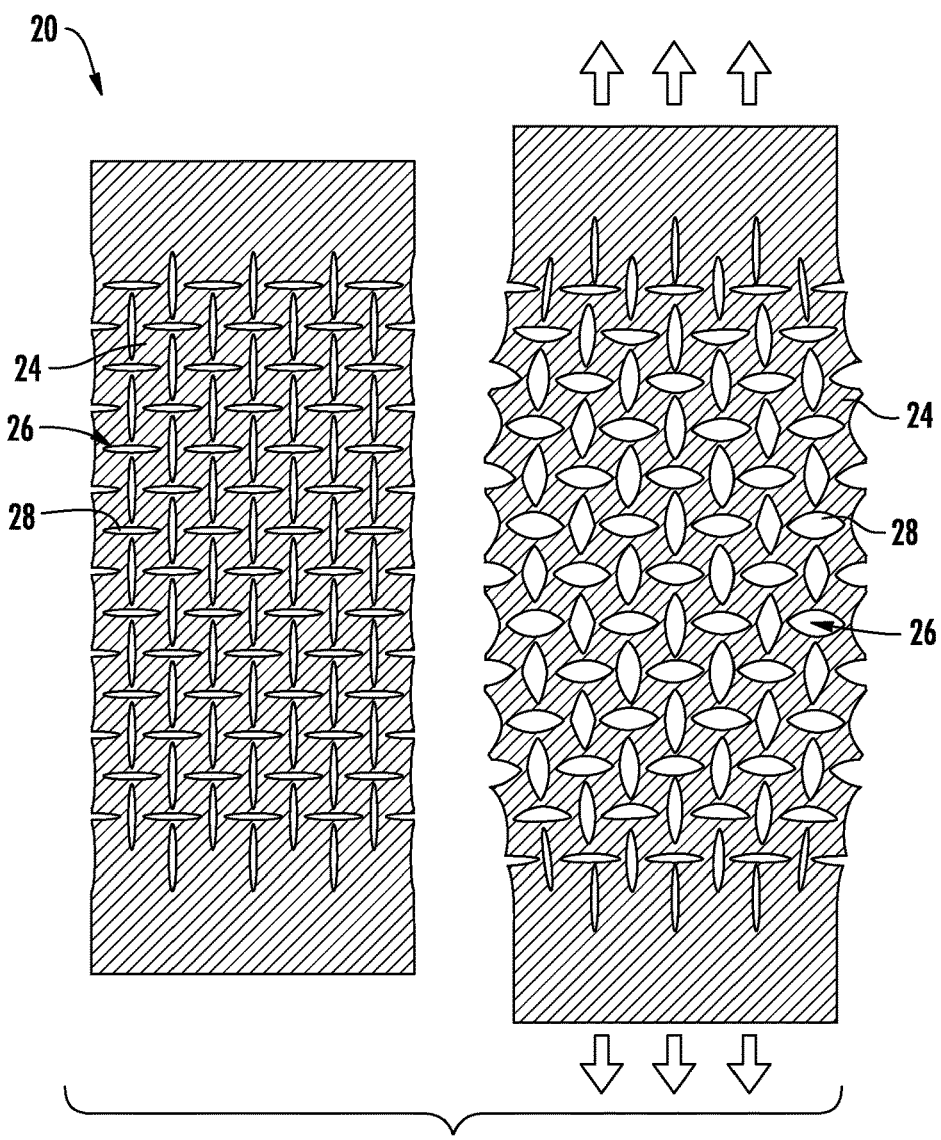
FIG. 3B shows a plan view of another alternative embodiment of the auxetic structure of FIGS. 3A and 3B.

The auxetic structure 10 in the exemplary embodiment of FIG. 2A comprises a plurality of interconnected segments 24 that are integrally formed to provide a repeating pattern of cells 26, and particularly an array of cells. Each cell 26 is defined by a plurality of the interconnected structural members in the form of segments 24 with a void 28 formed in the center of the cell 26. Each cell 26 shares segments 24 with adjacent cells. Together, the cells 26 form an array of reentrant shapes, including a plurality of rows and columns of shapes defined by the voids 28. In the embodiment of FIG. 2A, the reentrant shapes are bow-tie shapes (or auxetic hexagon shapes, similar to the shapes shown in FIGS. 1A and 1B). However, it will be recognized by those of ordinary skill in the art that the cells 26 of the auxetic structure may include differently shaped segments or other structural members and differently shaped voids. FIGS. 3A-3B show two exemplary alternative auxetic structures. In FIG. 3A, the cells 26 of the auxetic layer 20 have a twisted triangular or triangular vortex shape, and the interconnected structural members are curved segments. In FIG. 3B, the cells 26 are oval shaped, and the interconnected structural members are rectangular or square structures.

With reference again to the exemplary embodiment of FIGS. 2A and 2B, the segments 24 forming the cells 26 of the auxetic layer 20 are not necessarily uniform in shape and thickness. In particular, as shown in FIG. 2B, segment 24a is slightly bowed or convex along its length while segment 24b is substantially straight along its length. Segment 24a has a width, w, of between 1 mm and 5 mm, and particularly 3 mm. Segment 24b has a width, x, between 0.5 mm and 4 mm, and particularly 2 mm. While the segments 24 may vary somewhat in size and shape, the voids 28 are substantially uniform in size and shape. In the embodiment of FIG. 2B, the cell voids 28 have a height, y, between 6 and 12 mm, and particularly about 9.3 mm. The cell voids 28 have a width, z, between 6 and 12 mm, and particularly about 8.8 mm. Although not illustrated in FIG. 2B, the cross-sectional thickness of each segment 24 is between 0.5 mm and 5 mm, and more specifically in some embodiments, between 1 mm and 2 mm, and particularly about 1.5 mm.

The segments 24 forming the cells 26 of the auxetic layer 20 may be comprised of any of various different resilient materials. In at least one exemplary embodiment, the segments 24 are comprised of a polymer such as ethylene-vinyl acetate (EVA) having elastomeric qualities of softness and flexibility. In another exemplary embodiment, the segments 24 are comprised of a foam material, such as thermoplastic polyurethane (TPU) foam that is resilient and provides a cushioning effect when compressed. While EVA and TPU foam are disclosed herein as exemplary embodiments of the auxetic layer 20, it will be recognized by those of ordinary skill in the art that the auxetic layer 20 may alternatively be comprised of any of various other materials. For example, in other alternative embodiments, the auxetic layer may be comprised of polypropylene, polyethylene, XRD foam (e.g., the foam manufactured by the Rogers Corporation under the name PORON®), or any of various other polymer materials exhibiting sufficient flexibility and elastomeric qualities.

The segments 24 of the auxetic layer 20 may be formed in any of various methods. In at least one embodiment, the auxetic layer 20 is formed by a molding process, such as compression molding or injection molding. The auxetic layer 20 is then coupled to the base layer 22 using any of various connection methods, as will be recognized by those of ordinary skill in the art, including those described in further detail below. In at least one embodiment, the auxetic layer 20 is printed directly on to the base layer 22 using any of various printing methods, as will be recognized by those of ordinary skill in the art. Alternatively, the auxetic layer 20 may first be printed on a transfer sheet, and then a heat transfer method may be used to transfer the auxetic layer to the base layer 22.

As mentioned above, in at least one exemplary embodiment the interior portion (i.e., the void 28) formed by each cell 26 in the auxetic layer 20 is void of material. When the interior portion of each cell 26 is void of material, the second layer 22 is visible through the auxetic layer 20. However, in at least one alternative embodiment, the interior portion 28 of each cell 26 is filled with an elastic material, such as a hot melt or other thermoplastic material, that at least partially or substantially fills the interior portion 28 of the cell between the outer walls (i.e., the segments 24). Elastic material in the interior portion results in a more resilient auxetic structure. On the other hand, an interior portion 28 that remains void of material results in a more expansive auxetic structure 10.

With continued reference to FIG. 2A, the auxetic layer 20 is bonded or otherwise connected to the base layer 22 of the auxetic arrangement 14. The base layer 22 is comprised of a sheet of resilient fabric or other material having four way stretch capabilities. A material with four way stretch capabilities will stretch in a first direction and a second directly opposing direction as well as a third direction that is perpendicular to the first direction and a fourth direction that is directly opposite the third direction. In at least one embodiment, the elastic layer 22 is comprised of elastane fabric or other compression material having elastomeric fibers and four-way stretch capabilities. In at least one exemplary embodiment, the elastic layer 22 is comprised of the compression material incorporated into garments and accessories sold by Under Armour, Inc. as "Heat Gear"® or "Cold Gear"®.

Figure 2C:
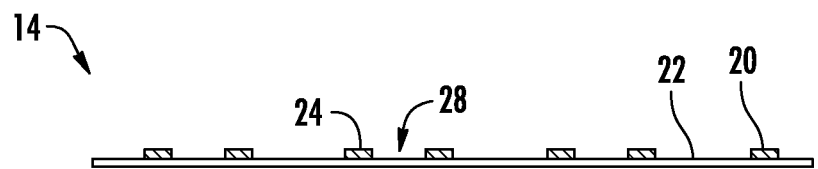
FIG. 2C shows a cross-sectional view of an exemplary embodiment of the auxetic arrangement of FIG. 2A.

With reference now to FIGS. 2A through 2J, the auxetic layer 20 is coupled to the base layer 22 in various embodiments of the auxetic arrangement 14. FIG. 2C shows a cross-sectional view of the auxetic layer 20 and base layer through line A-A of FIG. 2A. In the exemplary embodiment of FIG. 2C, the auxetic layer 20 is bonded or otherwise directly connected to the base layer 22 such that the two layers work together as a unitary sheet. To this end, the auxetic layer 20 may be connected to the base layer 22 using any of various means as will be recognized by those of ordinary skill in the art. For example, the auxetic layer 20 may be connected to the elastic layer 22 through the use of adhesives, molding, welding, sintering or any of various other means. The combination of the auxetic layer 20 and the connected base layer 22 allows the sheet of auxetic arrangement 14 to easily and smoothly form to various shapes and curvatures, including close double curvatures, without wrinkling or folding of the material. In particular, when a force is applied to the auxetic layer 20 causing it to expand (or contract) in one direction, the inherent structure of the auxetic layer results in associated expansion (or contraction) in a perpendicular direction. Although the base layer 22 is coupled to the auxetic layer 20, the base layer 22 does not restrict this expansion (or contraction) because of its four way stretch capability. Furthermore, when the force is removed, the resilient/elastic nature of the base layer 22 draws the auxetic layer 20 back to its original/static shape.

Figure 2D:
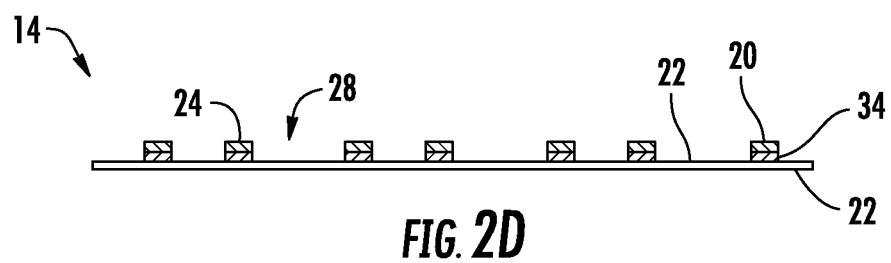
FIG. 2D shows a cross-sectional view of an exemplary embodiment of the auxetic arrangement of FIG. 2A further including a foam layer.

FIG. 2D shows a cross-sectional view of the auxetic layer 20 and base layer 22 according to another exemplary embodiment. In FIG. 2D, a foam layer 34 is provided between and couples the auxetic layer 20 to the base layer 22. The auxetic layer 20 and the base layer 22 may be coupled to the foam layer 34 using any of various means, including adhesives, molding, welding, sintering or any of various other means as will be recognized by those of ordinary skill in the art. The foam layer 34 is substantially the same shape and size as the auxetic layer and includes numerous segments and voids. The foam layer 34 may be comprised of any of various types of foam, such as a TPU foam, EVA foam, XRD foam (such as PORON® foam manufactured by Rogers Corporation). However, it will be recognized that the foam may be comprised of any of various materials, including other foam polymers. Because the foam layer 34 has the same structure as the auxetic layer 20, the foam layer 34 is configured to expand and contract with the auxetic layer, and does not provide substantial resistance to such expansion and contraction of the auxetic layer 20. However, the soft foam provides additional padding to the arrangement, with additional impact forces to the auxetic layer being absorbed by the foam layer 34. The foam layer 34 may be the same cross-sectional thickness as the segments 24 or a different thickness. In general, the cross-sectional thickness of the foam layer 34 is between 0.5 mm and 5 mm, and more specifically in some embodiments, between 1 mm and 2 mm, and particularly about 1.5 mm.

Figure 2E:
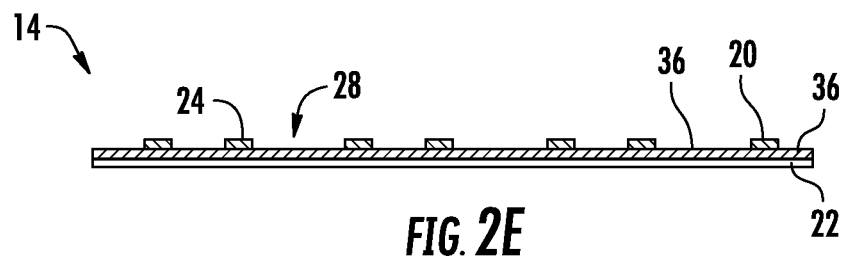
FIG. 2E shows a cross-sectional view of another exemplary embodiment of the auxetic arrangement of FIG. 2A further including another foam layer.

FIG. 2E shows a cross-sectional view of the auxetic layer 20 and base layer 22 according to another exemplary embodiment. In FIG. 2E, a foam layer 36 is provided between and couples the auxetic layer 20 to the base layer 22. The auxetic layer 20 and the base layer 22 may be coupled to the foam layer 36 using any of various means, including adhesives, molding, welding, sintering or any of various other means as will be recognized by those of ordinary skill in the art. The foam layer 36 is continuous and extends across the entire surface of the base layer 22 provided under the auxetic layer 20. Accordingly, the foam layer 36 may be referred to herein as a solid foam layer 36. The foam layer 36 may be comprised of any of various types of foam, such as a PU foam. However, it will be recognized that the foam may be comprised of any of various resilient materials, including other foam polymers. Because the foam layer 36 is resilient and elastic, the foam layer 36 will allow some expansion and contraction of the auxetic layer 20. However, because the foam layer 36 is continuous under the auxetic layer 20, the foam layer 36 provides some resistance to expansion and contraction of the auxetic layer 20. The resilient nature of the foam layer 36 also urges the auxetic layer 20 back to its static shape once a stretching force is removed from the auxetic layer 20. Again, the soft foam provided by the foam layer 36 provides additional padding to the arrangement, with additional impact forces to the auxetic layer being absorbed by the foam layer 36.

Figure 2F:
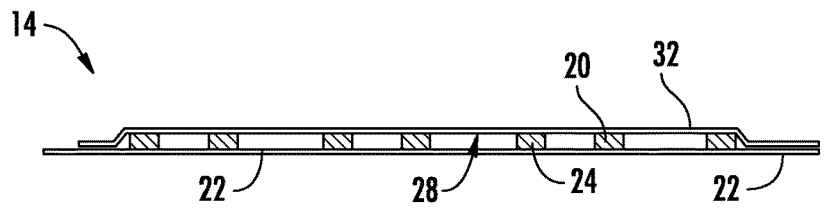
FIG. 2F shows a cross-sectional view of another exemplary embodiment of the auxetic arrangement of FIG. 2A further including a second elastic layer.

FIG. 2F shows a cross-sectional view of the auxetic layer 20 and base layer 22 according to yet another exemplary embodiment. In FIG. 2F, the article of apparel 16 includes an auxetic layer 20 sandwiched between an inner elastic layer (i.e., base layer 22) and an outer elastic layer 32. The outer elastic layer 32 may be comprised of the same or different material as the base layer 22, as described above, such as a four way stretch material. In this embodiment, the auxetic layer 20 is obscured from view, since the auxetic layer 20 is covered on both sides by layers of fabric on the inner elastic layer 22 and outer elastic layer 32. The outer elastic layer 32 provides additional resistance to expansion and contraction of the auxetic layer 20 over that provided when only a single elastic layer is provided as the base layer 22. Additionally, the outer elastic layer 32 provides additional resiliency to the arrangement, and urges the auxetic layer 20 back to its static shape once a stretching force is removed from the auxetic layer 20.

Figure 2G:
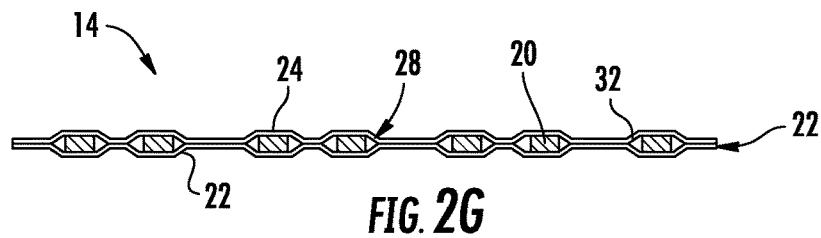
FIG. 2G shows a cross-sectional view of another exemplary embodiment of the auxetic arrangement of FIG. 2A further including a second elastic layer with interconnections of the elastic layers in the voids of the auxetic structure.

FIG. 2G shows a cross-sectional view of the auxetic layer 20 and base layer 22 according to another exemplary embodiment. In FIG. 2G, the article of apparel 16 includes an auxetic layer 20 sandwiched between an inner elastic layer (i.e., base layer 22) and an outer elastic layer 32, similar to that shown in FIG. 2F. However, in the embodiment of FIG. 2G, the outer elastic layer 32 is connected directly to the inner base layer 22 in the voids 28 of the auxetic layer 20. The connection between the outer elastic layer 32 and the inner base layer 22 may be accomplished in any of various ways as will be recognized by those of ordinary skill in the art, including the use of adhesives, molding, welding, sintering or any of various other means.

Figure 2H:
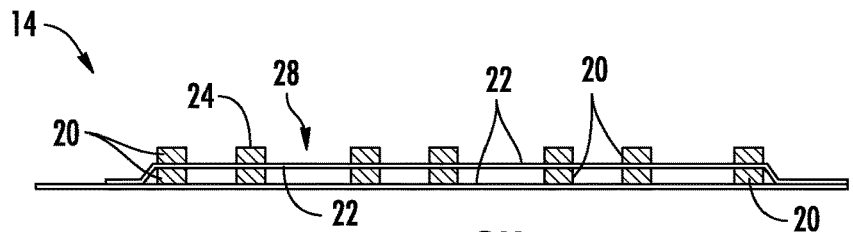
FIG. 2H shows a cross-sectional view of another exemplary embodiment of the auxetic arrangement of FIG. 2A further including a dual layer auxetic arrangement.

FIG. 2H shows a cross-sectional view of the auxetic layer 20 and base layer 22 according to another exemplary embodiment. The embodiment of FIG. 2H is similar to that of FIG. 2C, but in FIG. 2H, two layers of the auxetic layer 20 and base layer 22 are provided. In this embodiment, the segments 24 of the first auxetic layer are directly aligned with the segments of the second auxetic layer.

Figure 2I:
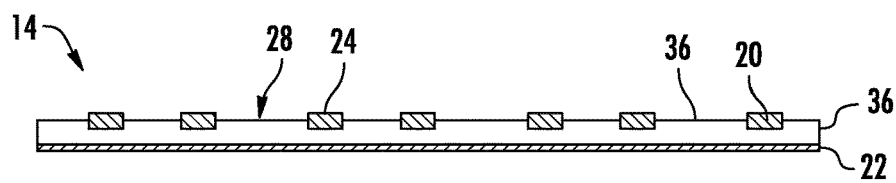
FIG. 2I shows a cross-sectional view of another exemplary embodiment of the auxetic arrangement of FIG. 2A further including a foam layer extending into voids in the auxetic structure.

FIG. 2I shows a cross-sectional view of the auxetic layer 20 and base layer 22 according to yet another exemplary embodiment. The exemplary embodiment of FIG. 2I is similar to that of FIG. 2E, but in the exemplary embodiment of FIG. 2I, the solid foam layer 36 extends partially into the voids 28 of the auxetic layer 20.

Figure 2J:
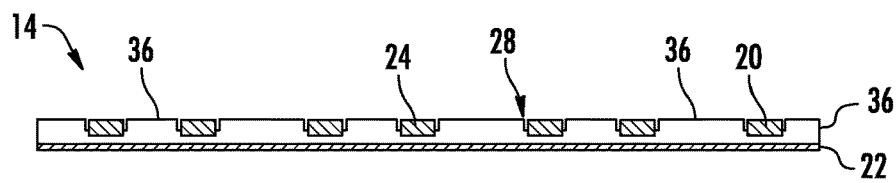
FIG. 2J shows a cross-sectional view of another exemplary embodiment of the auxetic arrangement of FIG. 2A further including a foam layer extending into voids in the auxetic structure and forming a substantially smooth outer surface with the segments of the auxetic layer.

FIG. 2J shows a cross-sectional view of the auxetic layer 20 and base layer 22 according to another exemplary embodiment. The exemplary embodiment of FIG. 2J is similar to that of FIG. 2I, but in the exemplary embodiment of FIG. 2I, the solid foam layer 36 extends completely through the voids 28 of the auxetic layer 20. As a result, the outer surface of the arrangement is substantially smooth to the touch of a human, as the outer surface of the foam layer 36 is substantially coplanar with the outer surface of the segments 24.

While various exemplary embodiments of the auxetic arrangement 14 have been shown in the embodiments of FIGS. 2C-2J, it will be appreciated that features from these various embodiments may be easily incorporated into other embodiments. For example, the elastic outer layer 32 of FIG. 2F may be easily added to an embodiment with an intermediate foam layer 34 or 36 between the auxetic layer 20 and the base layer 22, such as that shown in FIG. 2D or 2E. As another example, a two layer arrangement such as that shown in FIG. 2H may be prepared using the auxetic arrangement with an foam layer 34 or 36. Furthermore, the auxetic arrangement 14 described herein may be incorporated into any of various items of apparel, including garments, footwear, headwear, body pads, accessories, bags, and other items. Because the auxetic arrangement 14 easily conforms to various shapes and curvatures, the material provides a clean, neat appearance. Moreover, the stretching ability of the auxetic material provides for an extremely close fit for differently shaped wearers within a given size range.

Figure 4A:
FIG. 4A shows a perspective view of an article of apparel incorporating the auxetic arrangement of FIG. 2A in a cap.
Figure 4B:
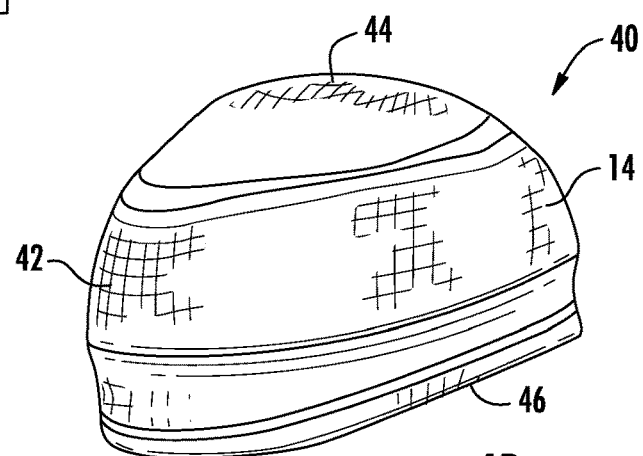
FIG. 4B shows a side view of the cap of FIG. 4A.
Figure 4C:
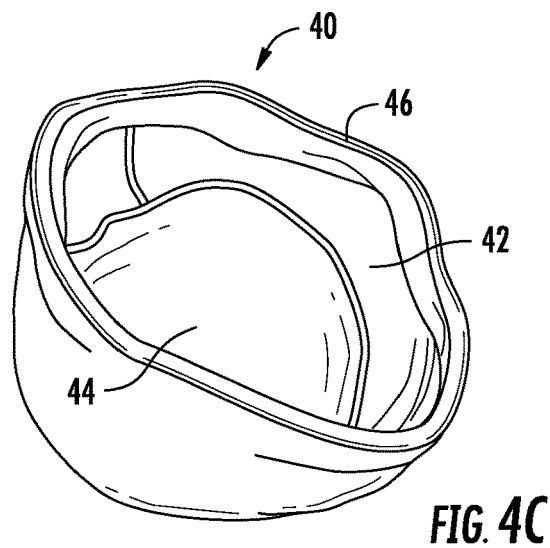
FIG. 4C shows a bottom perspective view of the cap of FIG. 4B.

With reference now to FIGS. 4A-4C, in at least one exemplary embodiment, the auxetic arrangement 14 described herein may be incorporated into skull caps 40 commonly worn under a football helmet. The skull cap 40 is used to provide additional protection for the wearer's head as well as allowing a tight fitting football helmet to slip easily over the head. The negative Poisson's ratio associated with the auxetic layer allows the skull cap and foam to fit a large number of different head sizes. Additional protection for the head is provided by the auxetic layer which is comprised of or backed by a shock absorbing foam material, such as the auxetic arrangement 14 shown in FIGS. 2D, 2E, 2I and 2J. The auxetic layer in combination with the shock absorbing foam material provides additional padding to protect the head from impacts commonly experienced during training or competition.

In the exemplary embodiment of FIGS. 4A-4C, the auxetic layer 20 is positioned between two compression layers 22 and 32, such as shown in FIG. 2F. Also, the auxetic arrangement 14 may be provided over the entire skull cap 40, or only over a portion of the skull cap. For example, the auxetic arrangement 14 may be provided as a conical or cylindrical portion 42, as shown in FIG. 4B, which extends completely around the cap 40 and is positioned on a middle area of the cap 40 between an upper crown portion 44 and a lower edge 46 of the cap 40.

With reference now to FIGS. 5A-8C, in at least one alternative embodiment, the auxetic arrangement 14 is incorporated into a shoe. Traditionally, shoe uppers are patterned and cut in a two-dimensional panels, and these two-dimensional panels are stitched together to form a general three-dimensional shape. With these traditional shoe uppers, the generic shape of the upper is often ill-fitting in specific areas that are difficult to form such as heel, ankle, arch, toes and instep. Accordingly, the auxetic arrangement 14 disclosed herein may be advantageously used to form various portions of shoes with the auxetic arrangement 14 is configured to smoothly fit multiple curvatures on a device without the need for numerous seams or cuts in the material. The auxetic arrangement 14 may be used to form a complete shoe upper or limited portions of the shoe upper, including the heel, ankle, arch, toes and instep.

FIGS. 5A-5D illustrate one exemplary embodiment of the auxetic arrangement 14 used to form a fully auxetic shoe upper 50 with customized fit. As shown in FIGS. 5A-5D, a two-piece of auxetic arrangement 14 may be cut into two predetermined shapes, formed in the shape of a foot, and then joined at two seams 52 and 53 (see FIGS. 5B and 5C) to form the shoe upper 50. The auxetic arrangement 14 described above, including the auxetic layer 20 in combination with the elastic layer 22, is easily manipulated to form the multiple curved surfaces required for the shoe upper 50. As shown in the figures, it is possible to form the complete shoe upper from only two pieces of the auxetic arrangement without wrinkling or folding of the material. These two pieces on the shoe upper 50 cover the entire foot, including the heel 56, midfoot 58 and toe regions 59. Although the embodiment of FIGS. 5A-5D shows a two-piece construction, in at least one alternative embodiment, a shoe upper with a one-piece construction may be formed using the auxetic arrangement 14 described herein. Once the shoe upper 50 is formed, it may be joined to a sole member 54, as shown in FIGS. 5A and 5B. Because of the auxetic arrangement 14, the shoe upper has an elastic yet expandable nature, allowing the shoe upper to provide a comfortable yet secure fit to various foot sizes and shapes.

Figure 6A:
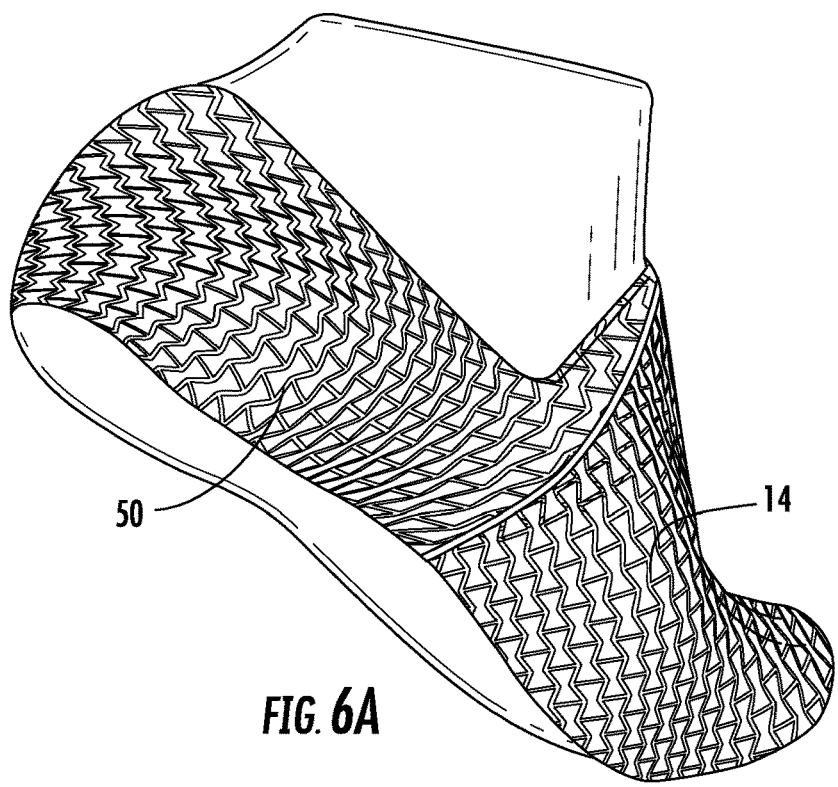
FIG. 6A shows a side perspective view of the shoe upper of FIG. 5A in a flexed position.
Figure 6B:
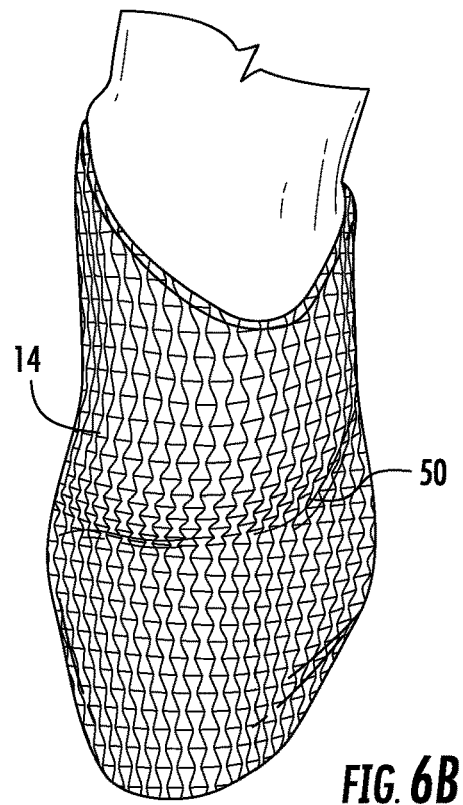
FIG. 6B shows a front perspective view of the shoe upper of FIG. 5B in a flexed position.

FIGS. 6A and 6B show the shoe upper of FIGS. 5A-5D during an athletic activity, such as walking or running, where the foot of the wearer bends and flexes during the activity. As shown in FIGS. 6A and 6B, the auxetic arrangement 14 allows the shoe upper 50 to continue to adhere closely to the foot of the wearer even when the foot is flexed during athletic activity, with only limited bending or creasing of the auxetic arrangement 14.

Figure 7A:
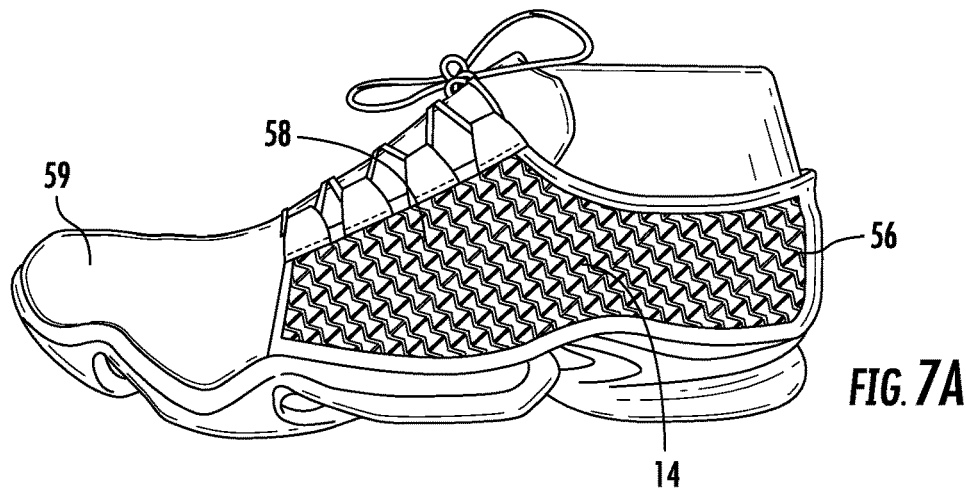
FIG. 7A shows a side perspective view of an article of apparel incorporating the auxetic arrangement of FIG. 2A in a midsole and heel portion of a shoe upper.
Figure 7B:
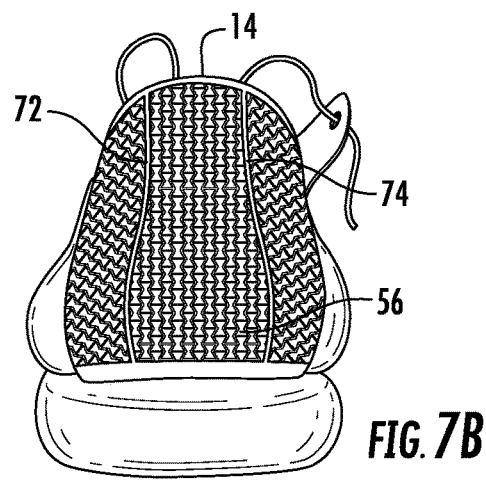
FIG. 7B shows a rear view of the shoe upper of FIG. 7A.
Figure 7C:
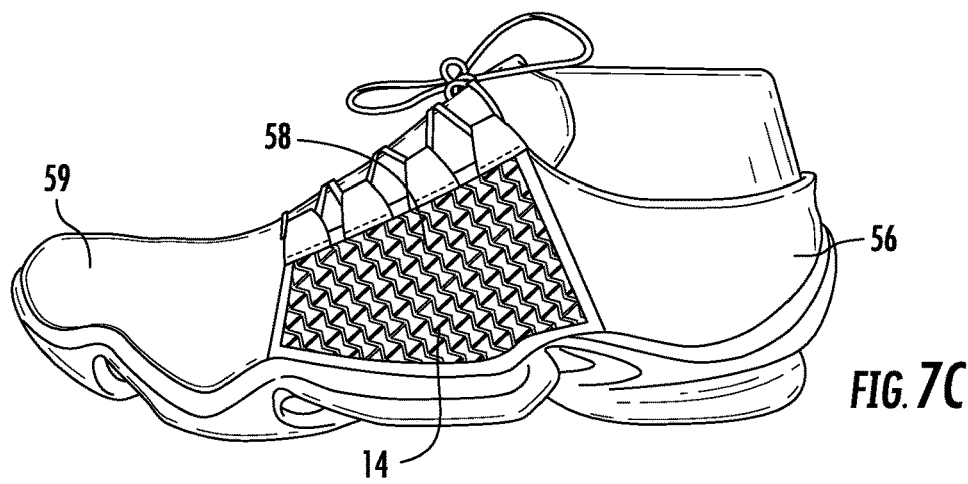
FIG. 7C shows a side perspective view of an article of apparel incorporating the auxetic arrangement of FIG. 2A in a midsole portion of a shoe upper.

FIGS. 7A-8C show various exemplary alternative embodiments in which the auxetic arrangement 14 is used to form only a portion of the shoe upper 50. In FIGS. 7A-7B, the auxetic material forms the heel 56 and midfoot portions 58 of the shoe, but does not extend to the forefoot portions or toes. In this embodiment, a hot melt is included in the inner portion of the auxetic cells, as discussed above, causing the auxetic material to be more resilient and offer additional support. Additionally, as shown in FIG. 7B, two seams 72 74 are provided in the heel portion 56 of the shoe, allowing the auxetic cells 26 to be positioned in a preferred orientation on the heel and both sides of the midfoot portion. This preferred orientation configures the shoe to anticipate forces that may act upon the shoe and associated directions where expansion or contraction of the panel with the auxetic arrangement 14 is most likely to be needed. FIG. 7C shows an alternative embodiment where the auxetic arrangement 14 is only provided on the midfoot portion 58 of the shoe, and does not extend back to the heel 56 or forward to the toe 59.

Figure 8A:
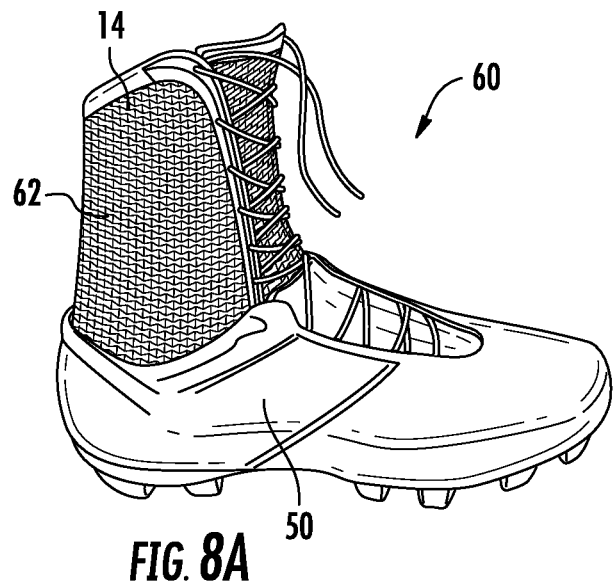
FIG. 8A shows a side perspective view of an article of apparel incorporating the auxetic arrangement of FIG. 2A in an ankle portion of a shoe upper for a high-top cleat.
Figure 8B:
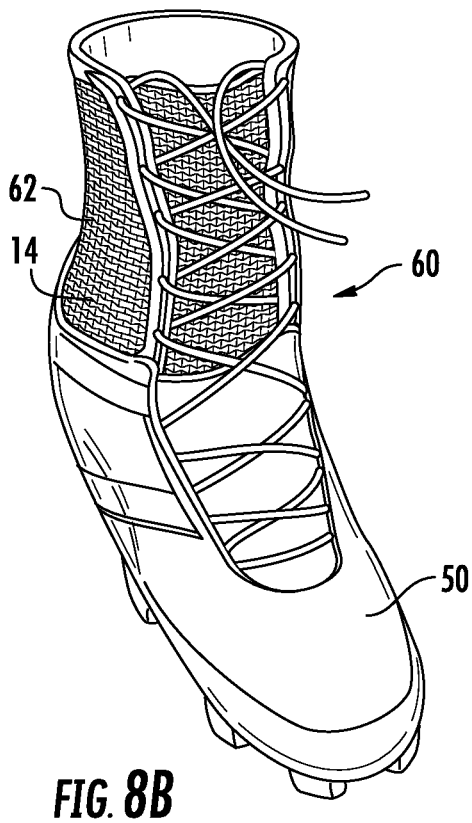
FIG. 8B shows a front perspective view of the high-top cleat of FIG. 8A.
Figure 8C:
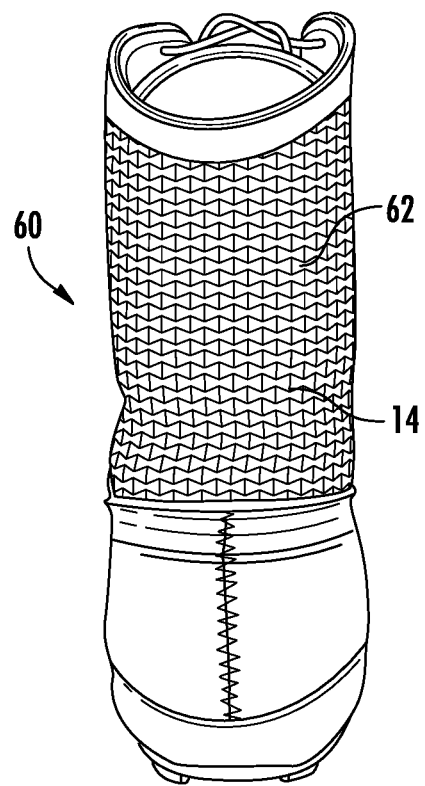
FIG. 8C shows a rear view of the high-top cleat of FIG. 8A.

FIGS. 8A-8C show another exemplary embodiment of footwear including the auxetic arrangement 14 described above. In this exemplary embodiment, the auxetic arrangement 14 is provided on an upper ankle portion 62 of a high top cleat 60. The auxetic arrangement 14 extends completely around the ankle region without extending to the heel, midfoot, or toe region of the cleat 60. The auxetic arrangement 14 is not only provided on the side of the ankle portion 62, but is also included on the tongue. The auxetic arrangement 14 on the ankle portion 62 may be provided as a two-piece construction, with one piece provided on the tongue, and another piece provided on the remainder of the ankle portion 62. Accordingly, no seams are required in the ankle region other than where the auxetic arrangement 14 connects to the other portions of the upper 50. Because the auxetic arrangement 14 easily conforms to the curvatures of the wearer's ankle, the auxetic arrangement acts as an ankle wrap on the wearer's ankle when the laces of the cleat 60 are tightened. Again, depending on the desired fit and support level, the cells of the auxetic layer 20 may be filled with a resilient material or may be void of material.

With reference to FIGS. 9A-9B, an exemplary embodiment of an article of apparel 16 is shown in the form of a shirt 80 including one or more panels formed the auxetic arrangement 14 described above. In the embodiment of FIGS. 9A-9B, the auxetic arrangement 14 extends over the entire surface of the shirt 80. However, in other alternative embodiments, the auxetic arrangement 14 may be provided on only certain areas of the shirt 80, such as a chest portion, back portion, or abdomen portion. As described previously, the auxetic layer 20 of the auxetic arrangement 14 may be formed from a molding process or may be formed by a printing process. If a printing process is used the auxetic layer 20 may be directly printed on the base layer 22, and the auxetic layer 20 will typically be much thinner than if the auxetic layer is a molded structure. For example, if the auxetic layer is printed, the thickness of the auxetic layer may be less than 1 mm.

Figure 10A:
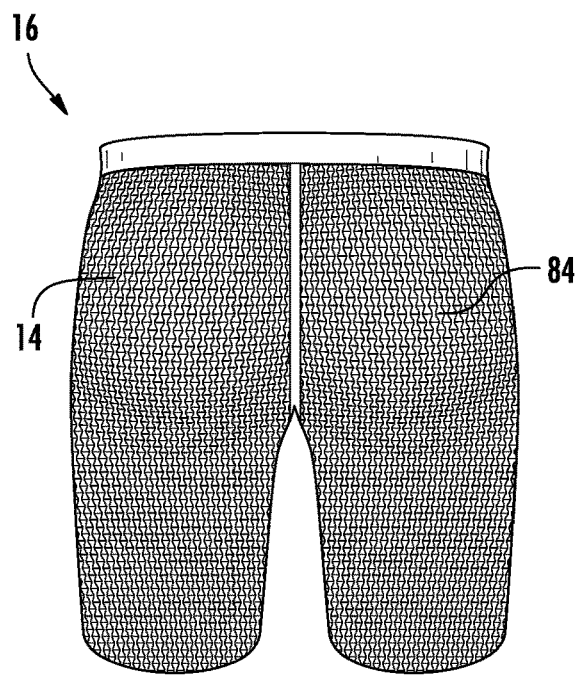
FIG. 10A shows a front view of an article of apparel incorporating the auxetic arrangement of FIG. 2A in a garment, and particularly a short.
Figure 10B:
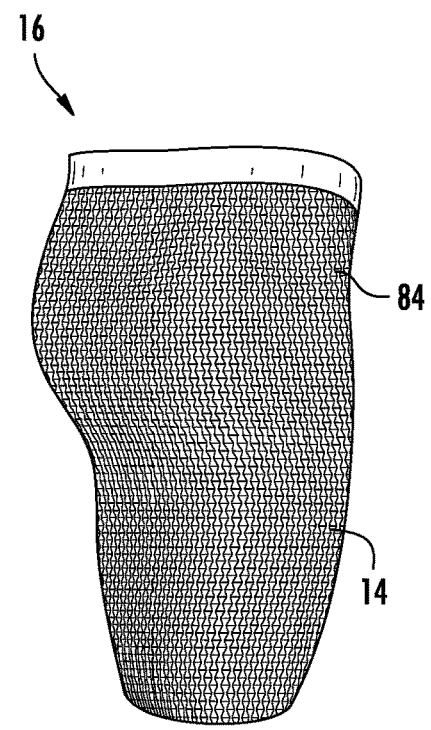
FIG. 10B shows a side view of the short of FIG. 10A.
Figure 10C:
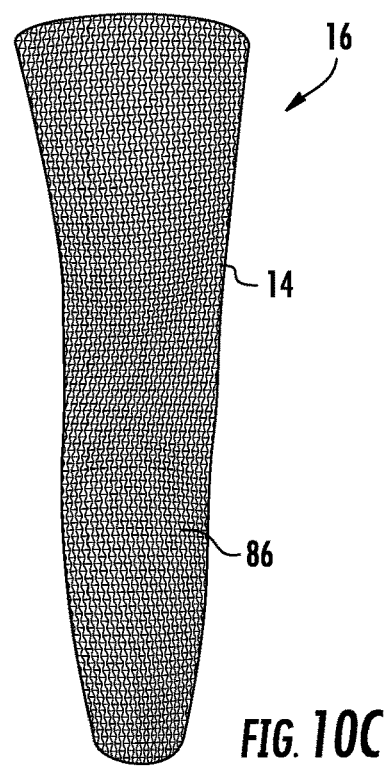
FIG. 10C shows a front view of an article of apparel incorporating the auxetic arrangement of FIG. 2A in a leg sleeve.

FIG. 9C shows an alternative exemplary embodiment wherein the article of apparel 16 is an arm sleeve 82. Similarly, FIGS. 10A-10B show an alternative exemplary embodiment wherein the article of apparel 16 is a short 84. Likewise, FIG. 10C shows an alternative exemplary embodiment wherein the article of apparel 16 is a leg sleeve 86. Each of these embodiments of FIGS. 9C-10C is similar to the embodiment of FIGS. 9A-9B, but the auxetic arrangement 14 is simply provided on a different article of apparel 16.

Figure 11A:
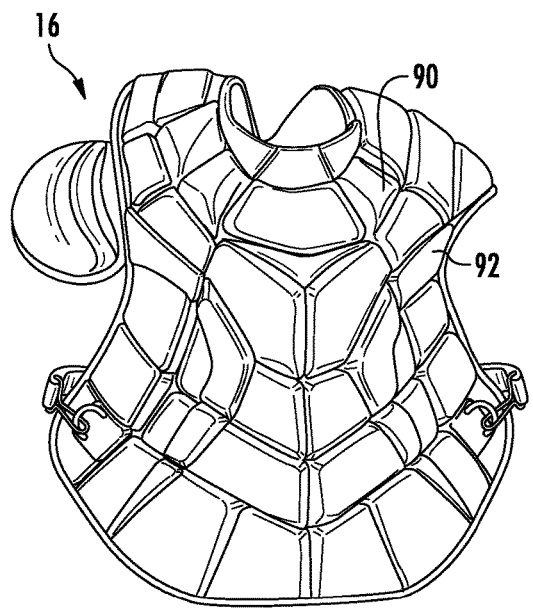
FIG. 11A shows a front view of an article of apparel incorporating the auxetic arrangement of FIG. 2A in a baseball chest protector.
Figure 11B:
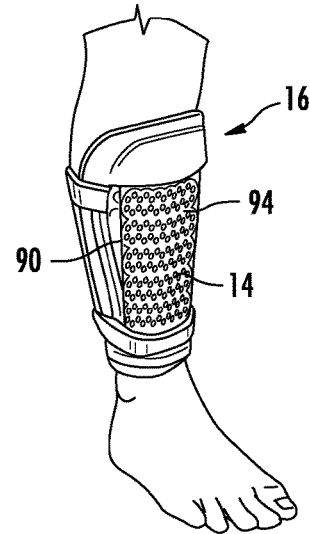
FIG. 11B shows a front perspective view of an article of apparel incorporating the auxetic arrangement of FIG. 2A in a soccer shin guard.
Figure 11C:
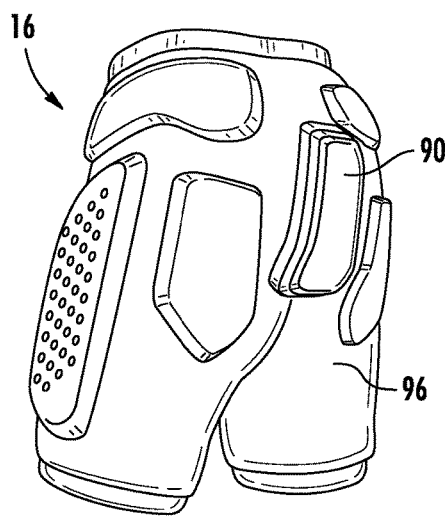
FIG. 11C shows a side perspective view of an article of apparel incorporating the auxetic arrangement of FIG. 2A in a girdle with protective pads.

As discussed above, the auxetic arrangement 14 may be provided on any of various articles of apparel 16. Additional examples of articles of apparel that may incorporate the auxetic arrangement 14 include protective pads 90 such as those shown in FIGS. 11A-11C, including the chest protector 92 of FIG. 11A, the shin guards 94 of FIG. 11B, or the protective girdle 96 of FIG. 11C.

Figure 12:
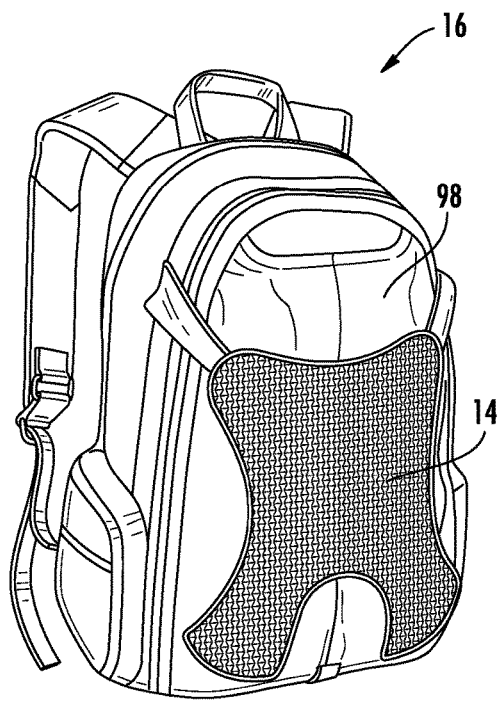
FIG. 12 shows a front perspective view of an article of apparel incorporating the auxetic arrangement of FIG. 2A in a backpack.

In yet another exemplary embodiment, the auxetic arrangement 14 may be provided in association with a bag, such as backpack 98 of FIG. 12. When a bag such as backpack 98 includes a panel incorporating the auxetic arrangement 14, and the panel is subjected to forces associated with carrying a load, the bag (and particularly the panel including the auxetic arrangement 14) will actually expand in size. Other exemplary uses for the auxetic arrangement in association with a bag include the use of the auxetic arrangement 14 on a strap for the bag, as explained in further detail below with reference to FIGS. 13A-14D.

Figure 13A:
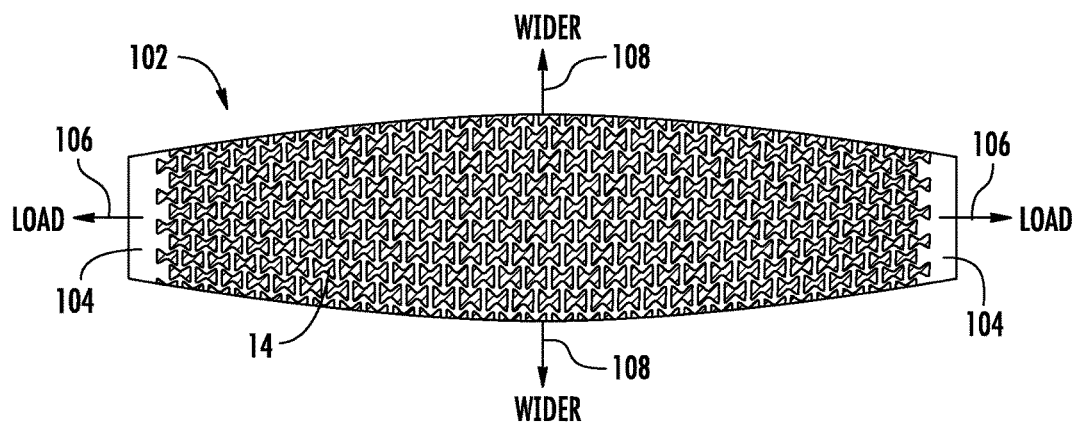
FIG. 13A shows a plan view of an article of apparel incorporating the auxetic arrangement of FIG. 2A in a shoulder pad for a strap of a carrying bag.
Figure 13B:
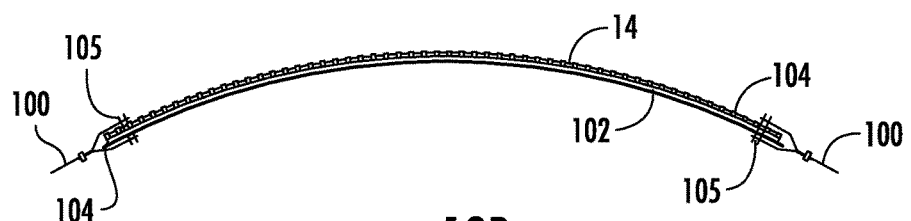
FIG. 13B shows a side view of the shoulder pad of FIG. 13A and an associated strap.

With reference to FIGS. 13A-13B in one exemplary embodiment, the article of apparel 16 is a shoulder pad 102 coupled to a carrying strap 100, and the auxetic arrangement 14 is included on the shoulder pad 102. As shown in FIG. 13B, the ends 104 of the shoulder pad 102 are directly connected to the carrying strap 100 by stitching 105 or other fastening means. The carrying strap 100, in turn, may be coupled to a bag (not shown) or any other carrying device or load. As shown in FIG. 13A, when a load 106 is applied to the ends 104 of the shoulder pad 102, the auxetic arrangement 14 expands in the direction of the applied load 106 and also in a direction 108 that is perpendicular to the applied load. As a result, the auxetic arrangement 14 of the shoulder pad 102 provides an increased surface area configured to bear the weight of the load. The increased surface area provided by the shoulder pad 102 makes carrying the load more comfortable for the user, as the weight of the load is spread across a greater area on the user's shoulder.

Figure 14A:
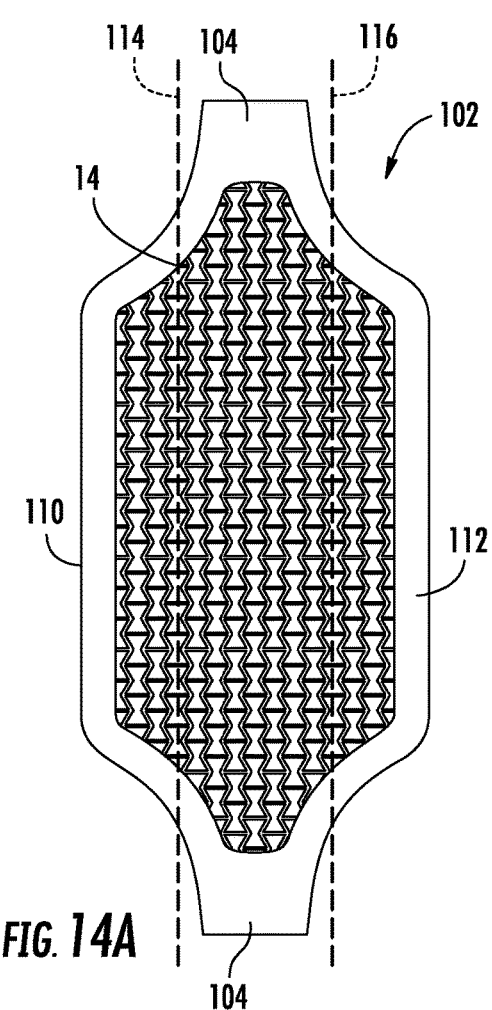
FIG. 14A shows a plan view of an article of apparel incorporating the auxetic arrangement of FIG. 2A in an alternative embodiment of a shoulder pad for a strap of a carrying bag.
Figure 14C:
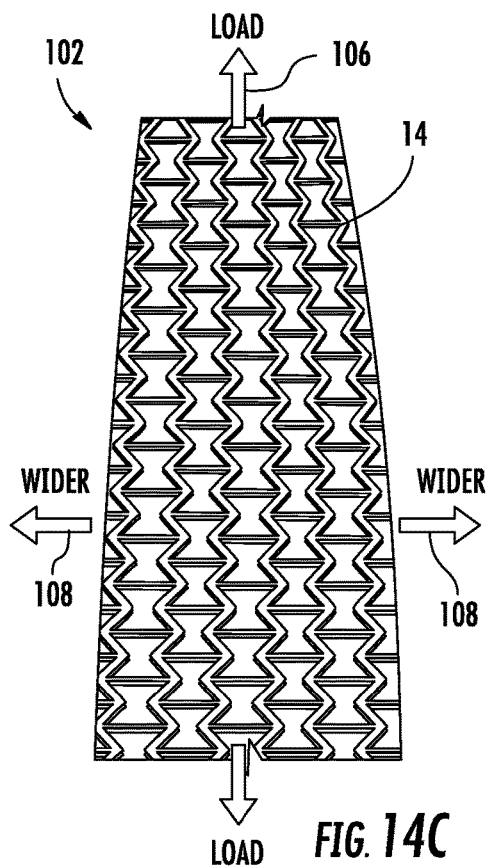
FIG. 14C shows a front perspective view of the shoulder strap of FIG. 14B.
Figure 14B:
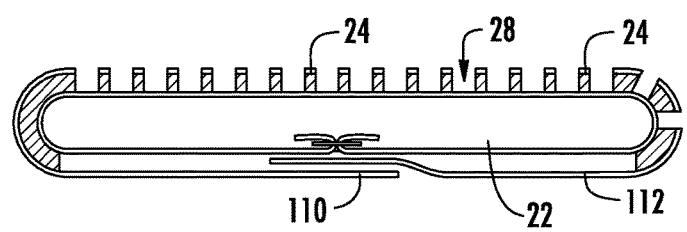
FIG. 14B shows a cross-sectional view of the shoulder pad of FIG. 14A configured for use with the shoulder strap.
Figure 14D:
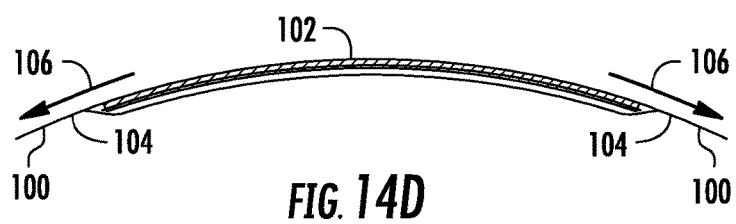
FIG. 14D shows a side view of the shoulder pad of FIG. 14A and an associated strap.

With reference now to FIGS. 14A-14D, an alternative embodiment of a shoulder pad 102 and carrying strap arrangement is shown. In this embodiment, the shoulder pad 102 is manufactured such that the auxetic arrangement 14 has the shape shown in FIG. 14A, including flared sides 110 and 112. As shown in FIG. 14B, the flared sides 110, 112 are folded under and connected together during manufacture of the shoulder pad 102, thus creating a two-layer shoulder pad. As a result, the longitudinal edges of the shoulder pad 102 are positioned along the dotted lines 114, 116 as shown in FIG. 14A. As shown in FIG. 14C, when a load 106 is applied to the ends 104 of the shoulder pad 102, the auxetic arrangement 14 expands in the direction of the applied load 106 and also in a direction 108 that is perpendicular to the applied load. As a result, the auxetic arrangement 14 of the shoulder pad 102 provides an increased surface area configured to bear the weight of the load. The increased surface area provided by the shoulder pad 102 makes carrying the load more comfortable for the user, as the weight of the load is spread across a greater area on the user's shoulder.

While the foregoing description provides a few limited exemplary embodiments of the auxetic arrangement 14 and associated use in various items of apparel, it will be recognized that numerous other embodiments are possible and contemplated although such additional embodiments are not specifically mentioned herein. For example, the auxetic material disclosed herein may also be used in scarves, gloves, hats, socks, sports bras, jackets, outdoor and hunting clothing, undergarments, elbow and knee pads, braces, bands, and various other articles of apparel.

The foregoing detailed description of one or more exemplary embodiments of the articles of apparel including auxetic materials has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed exemplary embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the exemplary embodiments contained herein.

What is claimed is:

1. An article of apparel comprising:
a base layer comprising a four way stretch material; and
an auxetic layer coupled to the base layer, the auxetic layer comprising an auxetic structure defining a repeating pattern of voids, wherein the base layer is exposed by at least one void of the auxetic layer.

2. The article of apparel of claim 1 wherein at least one void of the repeating pattern of voids defines a reentrant shape.

3. The article of apparel of claim 1 wherein at least one void of the repeating pattern of voids in the auxetic structure is at least partially filled with a foam.

4. The article of apparel of claim 1 wherein at least one void of the repeating pattern of voids in the auxetic structure is at least partially filled with a hot melt material.

5. The article of apparel of claim 1 wherein the four way stretch material is a compression fabric and an entirety of the auxetic layer is directly connected to the compression fabric such that the auxetic layer and the compression fabric form a unitary sheet.

6. The article of apparel of claim 1 wherein the auxetic structure is comprised of a polymer material.

7. The article of apparel of claim 6 wherein the polymer material is a foam material.

8. The article of apparel of claim 1 further comprising a foam layer between the base layer and the auxetic layer, the foam layer having a same shape as the auxetic layer.

9. The article of apparel of claim 1 wherein the base layer is positioned on a first side of the auxetic layer, the article of apparel further comprising a cover layer positioned on a second side of the auxetic layer.

10. The article of apparel of claim 9 wherein the base layer is connected to the cover layer in a plurality of the voids.

11. The article of apparel of claim 1 wherein each void has a bow-tie shape.

12. The article of apparel of claim 1 wherein the auxetic structure comprises a plurality of interconnected members.

13. The article of apparel of claim 12 wherein the interconnected members are between 1 mm and 5 mm wide.

14. An article of apparel comprising:
an elastic material; and
a near auxetic structure coupled to the elastic material, the near auxetic structure including a plurality of interconnected members forming an array of voids, wherein the elastic material is exposed by at least one void of the near auxetic structure.

15. The article of apparel of claim 14 wherein at least one void of the array of voids defines a reentrant shape, and wherein the first elastic layer and the second elastic layer are directly coupled to the near auxetic structure across an entirety of the near auxetic structure such that the first elastic layer, the near auxetic structure, and the second elastic layer form a unitary sheet.

16. The article of apparel of claim 14 wherein at least one void of the array of voids is at least partially filled with a polymer material.

17. The article of apparel of claim 14 wherein the elastic material provides a first elastic layer positioned on a first side of the near auxetic layer, the article of apparel further comprising a second elastic layer positioned on a second side of the near auxetic layer.

18. An article of apparel comprising:
a first layer comprising an elastic sheet; and
a second layer directly coupled to the first layer such that the first layer and the second layer form a unitary sheet, the second layer comprising a structure including a plurality of interconnected members defining a uniform array of substantially planar shapes with voids formed between the interconnected members in the second layer, each of the interconnected members directly coupled to the first layer, the structure having a Poisson's ratio of substantially zero or less than zero.

19. The article of apparel of claim 18 wherein at least one of the voids formed between the interconnected members defines a reentrant shape.

20. The article of apparel of claim 18 wherein at least one of the voids formed between the interconnected members is at least partially filled with a polymer material.

* * * * *